US012365769B2

(12) United States Patent
Gneuss et al.

(10) Patent No.: US 12,365,769 B2
(45) Date of Patent: Jul. 22, 2025

(54) METHOD FOR PRODUCING POLYMERS IN WHICH FILLERS ARE INCORPORATED AND HOMOGENEOUSLY DISTRIBUTED

(71) Applicant: GNEUSS GmbH, Bad Oeynhausen (DE)

(72) Inventors: Daniel Gneuss, Charlotte, NC (US); Detlef Gneuss, Carabietta (CH); Stephan Gneuss, Bad Oeynhausen (DE)

(73) Assignee: Gneuss GmbH, Bad Oeynhausen (DE)

(*) Notice: Subject to any disclaimer, the term of this patent is extended or adjusted under 35 U.S.C. 154(b) by 1026 days.

(21) Appl. No.: 17/221,554

(22) Filed: Apr. 2, 2021

(65) Prior Publication Data
US 2021/0221965 A1     Jul. 22, 2021

Related U.S. Application Data

(63) Continuation of application No. PCT/DE2019/100865, filed on Oct. 2, 2019.

(30) Foreign Application Priority Data

Oct. 4, 2018  (DE) .................. 10 2018 124 523.8

(51) Int. Cl.
| B29B 7/60 | (2006.01) |
| B29B 7/00 | (2006.01) |
| B29B 7/48 | (2006.01) |
| B29B 7/72 | (2006.01) |
| B29B 7/84 | (2006.01) |
| B29B 7/90 | (2006.01) |
| B29B 7/94 | (2006.01) |
| C08J 3/205 | (2006.01) |
| B29K 67/00 | (2006.01) |

(52) U.S. Cl.
CPC ............ *C08J 3/2056* (2013.01); *B29B 7/007* (2013.01); *B29B 7/487* (2013.01); *B29B 7/60* (2013.01); *B29B 7/72* (2013.01); *B29B 7/84* (2013.01); *B29B 7/90* (2013.01); *B29B 7/94* (2013.01); *B29K 2067/00* (2013.01); *C08J 2367/00* (2013.01)

(58) Field of Classification Search
CPC ..... C08J 2367/00; C08J 3/2056; B29B 7/007; B29B 7/487; B29B 7/60; B29B 7/72; B29B 7/84; B29B 7/90; B29B 7/94; B29K 2067/00
USPC ...................................................... 524/599
See application file for complete search history.

(56) References Cited

U.S. PATENT DOCUMENTS

| 3,824,208 | A | 7/1974 | Link et al. |
| 6,149,850 | A | 11/2000 | Gannon |
| 7,513,677 | B2 | 4/2009 | Gneuss et al. |
| 10,563,036 | B2 | 2/2020 | Gneuss et al. |
| 2002/0077443 | A1 | 6/2002 | Nichols et al. |
| 2012/0292578 | A1 | 11/2012 | Bacher et al. |

FOREIGN PATENT DOCUMENTS

| DE | 2409541 A1 | 9/1974 |
| DE | 102005025975 A1 | 12/2006 |
| DE | 102009013418 A1 | 9/2010 |
| EP | 0477634 A2 | 4/1992 |
| EP | 1434680 B1 | 7/2006 |
| GB | 1373155 A | 11/1974 |
| WO | WO2011060839 A1 | 5/2011 |
| WO | WO2017102313 A1 | 6/2017 |

OTHER PUBLICATIONS

Mikonsaari Irma:"Direktprozess zur Herstellung von Nanosuspensionen und deren Zudosierung in thermoplastische Matrices zur Herstellung von Nanocomposites" In: Direktprozess zur Herstellung von Nanosuspensionen und deren Zudosierung in thermoplastische Matrices zur Herstellung von Nanocomposites; Fraunhofer, p. 1.*
International Search Report dated Dec. 17, 2019 in corresponding application PCT/DE2019/100865.
Irma Mikonsaari: "Direktprozess zur Herstellung von Nanosuspensionen und deren Zudosierung in thermoplastische Matrices zur Herstellung von Nanocomposites", Fraunhofer, pp. 1-231, Dec. 31, 2011, ISBN: 978-3-8396-0219-5.
"Reversible Polymerization" Oct. 12, 2019, pp. 1-4, retrieved from the Internet https://polymerdatabase.com/polymer%20chemistry/Reversible%20Polymerization.html (retrieved on Apr. 15, 2021 as no snapshot of Oct. 12, 2019 available).

* cited by examiner

*Primary Examiner* — Kelechi C Egwim
(74) *Attorney, Agent, or Firm* — Muncy, Geissler, Olds & Lowe, P.C.

(57) ABSTRACT

For the production of polymers in which there are fillers with particle sizes below 10 µm incorporated and homogeneously distributed, a polymer starting material is input into a twin-screw extruder and is melted there to give a melt. In a conveying and mixing section, a suspension, which is formed of the fillers and of a carrier liquid, is injected into the melt. The melt viscosity is reduced by injection of the carrier liquid in the conveying and mixing section in that a cleavable polycondensate is used as polymer and low-molecular-weight cleavage product arising during the polycondensation is used as carrier liquid, and therefore the molten polymer is at least to some extent depolymerized within the conveying and mixing section. That the mixture, which is formed of the melt whose viscosity is reduced by cleavage, of the remainder of the carrier liquid and of the fillers, is homogenized.

11 Claims, 1 Drawing Sheet

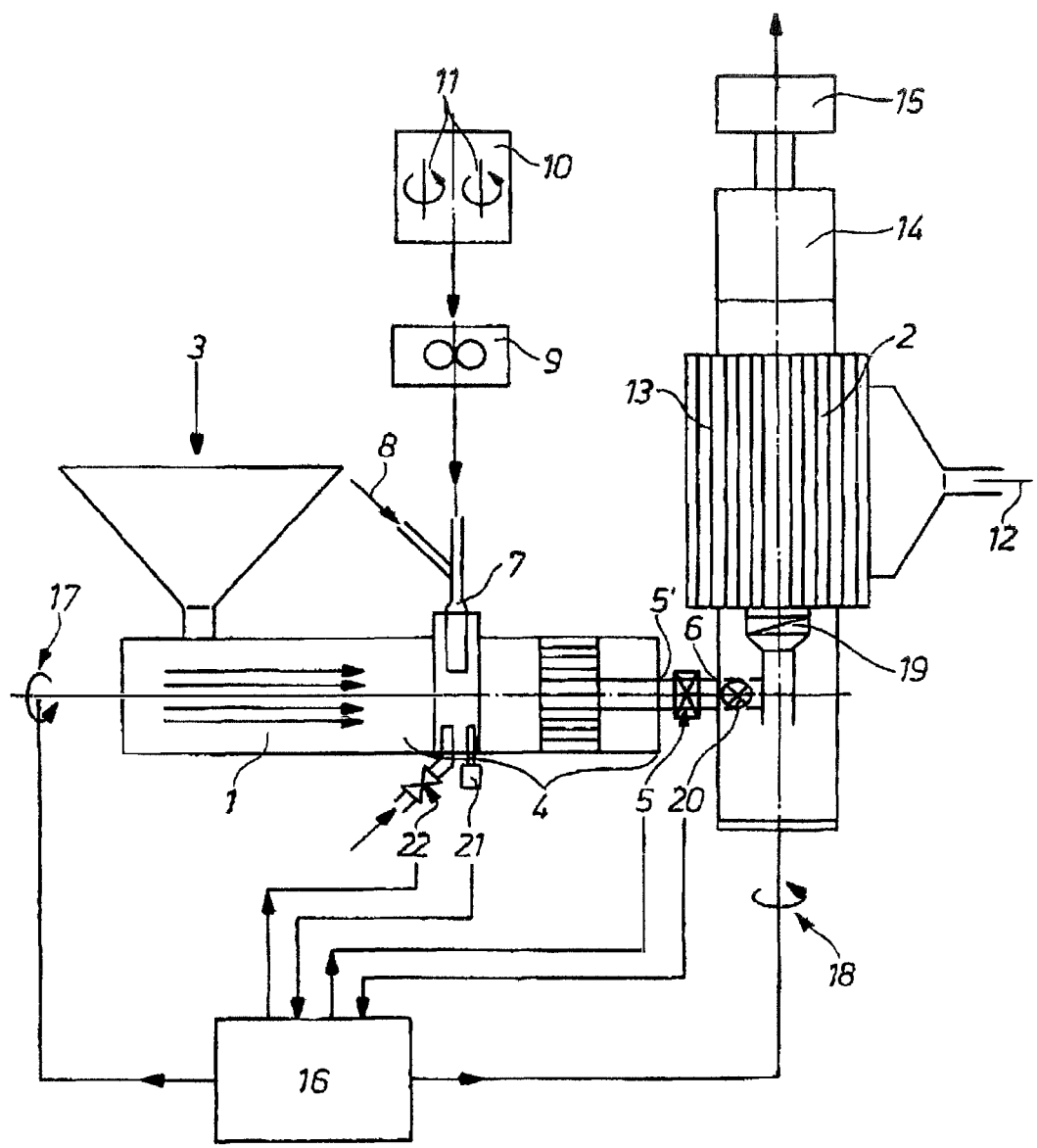

METHOD FOR PRODUCING POLYMERS IN WHICH FILLERS ARE INCORPORATED AND HOMOGENEOUSLY DISTRIBUTED

This nonprovisional application is a continuation of International Application No. PCT/DE2019/100865, which was filed on Oct. 2, 2019 and which claims priority to German Patent Application No. 10 2018 124 523.8, which was filed in Germany on Oct. 4, 2018 and which are both herein incorporated by reference.

BACKGROUND OF THE INVENTION

Field of the Invention

The present invention relates to a process for the production of polymers in which there are fillers incorporated and homogeneously distributed.

Description of the Background Art

It is already known that the properties of plastics, for example appearance, haptic properties, conductivity, strength, etc., can be influenced by introduction of fillers into an appropriate plastics melt. It should be noted here that as the particle diameter of the filler decreases the ratio of surface area to volume of the filler increases. Because this ratio, or the surface area of the fillers, substantially determines the properties of the plastics in many applications, it is frequently necessary to maximize the fineness of particles used. Care must be taken here to avoid clumping of the particles, because the abovementioned ratio or the active surface area, would be smaller in the case of clumped particles. It is often desirable to use what are known as nanoparticles with diameters below 100 nm. As particle size decreases, it becomes ever more difficult to prevent agglomeration of the fillers due to the increase of the surface-area-volume ratio, and therefore traditional methods, for example of the type known from DE 10 2009 013 418 A1, according to which nanoparticles in the form of powder are incorporated into the melt, prove to be unsuitable in practice.

It is also known, however, that suspensions comprising fillers can be introduced into a melt, and that, after mixing of the suspension with the melt, the liquid constituent of the suspension can be removed from the melt.

WO 2011/060 839 A1 discloses a process for the production of polymers comprising very finely distributed fillers. Polymer starting material is introduced into a twin-screw extruder by way of the hopper, and is conveyed and melted therein with increase of pressure. Downstream of the pressure increase, a filler suspension is injected into the melt in the conveying and mixing zone, where the melt pressure is above the vapor pressure. At the end of a conveying and mixing section, after the homogeneous mixing of polymer and filler suspension, the mixture is devolatilized in devolatilizing equipment, where the solvent evaporates.

However, the process is not suitable for medium- to high-viscosity polymers, because the high viscosity of the melt, in comparison with the carrier liquid, is inimical to homogeneous mixing of the polymer with the filler. Despite the dispersions of the fillers in a liquid solvent, a high degree of mixing and distribution can be achieved only by use of particular mechanical mixing devices, i.e. with use of high drive power and pressure.

In the process described in DE 2 409 541 A, which corresponds to U.S. Pat. No. 3,824,208 fillers are introduced into a sticky polymeric main substance via fine comminution of the fillers and incorporation thereof into said main substance in a ratio of 1:7 thereto. The incorporation is achieved by way of mechanical mixing device, for example mixers and kneaders.

DE 10 2005 025 975 A1 describes the production of high-molecular-weight polymers by solid-phase condensation. This process cannot be carried out continuously in an extruder. No connection with the incorporation of very fine fillers is described.

GB 1 373 155 A describes the controlled depolymerization of rubber wastes and plastics wastes in a multiple-screw extruder, where the extruder screws are arranged within a plane alongside one another. Here again, no connection with the incorporation of very fine fillers is found.

SUMMARY OF THE INVENTION

It is therefore an object of the present invention to provide a process for the production of a filled polymer which is filled with very finely distributed fillers with particle sizes below 10 μm, for example nanoparticles, by which process it is possible to incorporate the fillers rapidly, at low energy cost and particularly uniformly, into medium- to high-viscosity polymer melts, without any adverse effect on the polymer.

Whereas care is usually taken during further processing to avoid disadvantageous alteration of a polymer after production thereof, the invention specifically embraces this step: a polymer that can be cleaved into monomers by a reverse reaction is used as vehicle for the fillers, and the very same low-molecular-weight cleavage product that is eliminated in the synthesis reaction is used as carrier liquid for the fillers. The reverse reaction is therefore intentionally induced in the invention so that, before and/or during the incorporation of the fillers and the homogenization of the suspension, a depolymerization takes place which reduces the viscosity of the polymer.

Materials that can be used as polymer for the invention are all of the polycondensates for which, under the conditions that can be established during melt extrusion, e.g. relating to temperature and pressure, it is possible, as soon as the cleavage product is added as carrier liquid, to induce the reaction that reverses the polycondensation. Materials that can be used as plastics are therefore polyesters, polyamides and polycarbonates, and a material that can be used as carrier liquid is water or a mono- or polyhydric alcohol.

Most of the polycondensates that are important in plastics technology eliminate water during their synthesis, and therefore subsequent addition of water induces hydrolysis as reverse reaction. Accordingly, the invention is described below by taking water as carrier liquid for the suspension, even though other suitable carrier liquids are equally concomitantly encompassed by the invention.

When the carrier liquid is now injected into the previously melted polymer, irrespective of whether the carrier liquid is injected as suspension with the fillers or initially while still in pure form, the effect of pressure and temperature in the twin-screw extruder immediately causes onset of hydrolysis or another reverse reaction. Long polymer chains are divided, and viscosity decreases greatly. This narrows the viscosity differences between the suspension that is to be injected and the polymer melt, the viscosity of which is now low. At this stage it is possible to achieve homogeneous distribution very successfully and rapidly and with only little mechanical drive power required for mixing. Although on the one hand it is necessary to achieve the vital final outcome of homogeneous distribution of the fillers in the polymer, it is also necessary to achieve homogeneous distribution of the remainder of the carrier liquid, in order to prevent local demixing phenomena during the subsequent removal of the carrier liquid.

Because the melt in this process phase has a substantially lower viscosity, it is possible to incorporate the fillers successfully into the melt, and a homogeneous mixture of the fillers, e.g. nanoparticles, with the melt is therefore rapidly produced. The fillers remain in the suspension until they come into contact with the melt, i.e. there is no premature evaporation of the aqueous carrier medium. The fillers do not agglomerate during the injection and mixing procedure.

In the context of the present invention, the term "melt" denotes not only the polymeric fractions that continue to remain in molten form, but also the cleaved polymer molecules and monomeric fractions that may be increasingly present in the mixture as a consequence of the reverse reaction that has already taken place.

The removal of the carrier liquid that is to take place in the next step is accompanied by a significant increase in the viscosity of the polymer melt, because removal of, for example, water, which forms the carrier liquid for the fillers, from the mixture of polymers, monomers, fillers and, of course, carrier liquid has an effect significantly greater than merely mechanical removal of the carrier liquid. Instead, removal of the water with simultaneous continuing influence of pressure and heat results in onset of polycondensation as chemical synthesis reaction which bonds molecular chains to one another or uses monomers to lengthen said chains, with a resultant viscosity increase.

The concept underlying the invention is therefore that a liquid is not merely utilized as temporary carrier of the fillers but is simultaneously utilized for temporary chemical alteration of the polymer into which the fillers are to be incorporated. This temporarily facilitates fine-grade mixing, and the end product from the procedure is the polymer with the properties that it previously possessed, or indeed with a viscosity which is appropriate for the respective intended use, and is therefore optimized.

The intended conduct of the process comprises input of a polymer starting material by way of a feed hopper into a twin-screw extruder, and then melting of the polymer starting material in the twin-screw extruder. By way of a conveying and mixing section, a pressure is then generated in the melt in the twin-screw extruder. After generation of the pressure, a suspension comprised of the fillers and of a carrier liquid is injected into the melt in an injection chamber arranged in the ingoing region of the conveying and mixing section, where the pressure in the twin-screw extruder and, respectively, in the injection chamber is set or controlled in the region of 50 bar, preferably 25 bar, and in particular to about 5 bar above to below the phase-transition boundary of the carrier liquid, as required by the polymer starting material and suspension. The suspension is thus homogeneously mixed with the polymer starting material, with reduction of the viscosity of the melt, and at the end of the conveying and mixing section the homogeneous polymer mixture is transferred into a devolatilizing extruder. As a result of application of a vacuum here in the devolatilizing extruder, the carrier liquid is evaporated from the polymer mixture and conducted away, with increase of the viscosity of the melt, while the fillers remain homogeneously distributed in the polymer mixture; a polymer melt comprising very finely distributed fillers is thus produced, and is then discharged from the devolatilizing extruder.

Advantageously, there is a start-up procedure which is initiated by way of a control device and in which initially only carrier liquid is injected into the conveying and mixing section, so that the viscosity of the polymer starting material is reduced, and so that, after subsequent switchover by the control device from carrier-liquid injection to suspension injection, the suspension can immediately be incorporated into the low-viscosity melt. The resultant effect is that, in contrast to the conventional manner of processing and treatment of, for example, polyester, low viscosity of said material is achieved by injection of water. On switchover from injection of water to the aqueous suspension it is thus possible, without any great exertion of force, to incorporate the filler particles immediately and very successfully into the low-viscosity melt. The aqueous constituent of the suspension ensures that the viscosity of the continuously advancing and freshly melted polymer material is likewise reduced by hydrolysis that here is desired, but conventionally is, as far as possible, avoided; this provides the advantage of easy and successful incorporation of the filler particles into the polymer melt.

It has proven advisable to control the pressure in the injection chamber between 20 bar and 200 bar, where a pressure sensor in the injection chamber provides the actual pressure values to the control device, which sets the required pressure by influencing an adjustable melt-flow restrictor arranged between the twin-screw extruder and the devolatilizing extruder, and/or by influencing a suspension pump.

It is advantageous that the control device controls the evacuation rate in the devolatilizing extruder by adjusting the reduced pressure for a specified flow rate and flow velocity, thus permitting adjustment of the viscosity of the discharged melt.

A particular advantage is obtained when the time between suspension injection and start of evacuation is more than 1 second and less than 30 seconds.

The reversal of the viscosity from low to high as a result of extraction of the water is subject to time limits dependent on the material. If the time between the injection of the water or of the aqueous suspension and the devolatilization procedure is excessive, it is no longer possible to reverse the viscosity to the desired extent, and the permitted time interval should therefore be maintained at more than 1 second and less than 30 seconds.

It is important that the evacuation procedure extracts at least 90%, preferably at least 99%, of the carrier liquid from the melt within 1 to 10 seconds. This rapid extraction of the carrier liquid in a single stage necessary in order to prevent the reversal of the viscosity from low to high without any adverse effects on the melt. The sum of the permitted time interval for the incorporation of the aqueous suspension into the melt and conclusion of the subsequent evacuation is therefore not permitted to exceed about 30 seconds, because otherwise adverse effects on the polymer used, depending on the nature thereof, are likely to be observed.

In order to achieve this type of rapid devolatilization of the melt, it is advantageous to adjust the vacuum to between 40 mbar and 0.01 mbar at the devolatilizing extruder.

A quantity of added suspension that has proven successful is between 0.02 and 25 percent by volume of the quantity of polymer.

It is thus possible in the invention that hydrolysis, which is intentionally brought about, but conventionally is to be avoided, is controlled in a manner that allows achievement of the desired final viscosity of the polymer melt comprising filler particles.

For the ideal maintenance or better control of the pressure in the twin-screw extruder, it is proposed that inert gas is added in the region of the injection chamber. This can be carbon dioxide, nitrogen or else a noble gas; by way of example, carbon dioxide here has a favorable effect on the homogenization procedure, because carbon dioxide dissolves not only in water as carrier liquid but also in the polymer melt, in relatively large quantities, and additionally reduces the viscosity of the melt—the water having already done so—and has a substantial influence on the phase transition of the water from liquid to gaseous.

The object in relation to equipment is in particular achieved via a cascade arrangement of a twin-screw extruder for the melting of polymer starting material and for the mixing with a suspension with a single-barrel devolatilizing extruder, where the cascade arrangement has an allocated control device which not only controls the start-up of the cascade arrangement but also controls the actual production of the polymer comprising very finely distributed fillers.

The cascade arrangement of a twin-screw extruder which is intended for the melting and mixing and which, without vacuum connection, can be set up at low cost and, without vacuum, can be operated at low cost, and of a devolatilizing extruder uses two extruders that can be driven separately from one another, each of which can be controlled for ideal rotation rate and power consumption, so that in the twin-screw extruder it is possible to set ideal conditions for the melting of the starting material, the introduction of the suspension, and the mixing, and in the devolatilizing extruder it is possible to set the ideal characteristics for the extraction of the carrier liquid.

It is advantage here that the devolatilizing extruder has, arranged in an evacuation drum, a multiple-screw extruder component which is formed essentially of a rotatably driven guide body which accepts a plurality of screws in cylindrical cutouts, where the cylindrical cutouts of the guide body enclose the length of the respective screws to an extent that is above 180° and below 360°, and the resultant slot apertures are oriented toward the wall of the evacuation drum, and where the screws are driven by way of toothed gear transmission systems so that they rotate in the guide body.

The use of a devolatilizing extruder, as in essence disclosed in EP 1 434 680 B1, which corresponds to US 2005/0047267, which is incorporated herein by reference, ensures that during transport through the multiple-screw extruder component the melt experiences a high degree of surface exchange, as a consequence of which the vacuum can achieve contact with the melt over a large surface area, so that water present in the melt can evaporate very rapidly and can undergo effective extraction from the melt.

It is advantageous to assign at least one permanently open injection nozzle to the twin-screw extruder in the region of the injection chamber, and to connect the injection nozzle(s) to a carrier-liquid supply line and/or to a suspension pump, where the suspension pump is coupled to a suspension silo comprising a mixing unit.

Use of a mixing unit is a first measure intended to avoid precipitation, or possibly agglomeration of the filler particles in the suspension. However, the use of the open injection nozzle which offers, to the suspensions, no further obstruction at which agglomeration of the filler particles could occur is another measure contributing to the fact that, rather than agglomerates of filler particles, it is fillers with particle sizes below 10 µm, preferably nanoparticles with particle sizes in the range 200 nm to 300 nm, that pass into the melt, thus permitting particularly rapid incorporation of the filler particles and good homogeneous mixing of the melt with the filler particles.

It is also advantageous to provide thermal insulation between the at least one injection nozzle and the injection chamber and/or to provide separate temperature-control of these. This ensures that the carrier liquid of the suspension, e.g. water, does not begin to evaporate before the suspension reaches the internal chamber of the twin-screw extruder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows an extruder and a devolatilizing extruder according to an exemplary embodiment.

DETAILED DESCRIPTION

The FIGURE shows a twin-screw extruder 1 and a devolatilizing extruder 2, both these two devices being arranged in succession in the form of a cascade. The twin-screw extruder has a feed hopper 3, by way of which polymer starting material can be introduced gravimetrically into the twin-screw extruder. In the twin-screw extruder 1, the polymer starting material is plastified and transported by way of a conveying and mixing section 4 to the outgoing end 5' of the twin-screw extruder 1. The outgoing end 5' of the twin-screw extruder 1 leads, by way of a flow restrictor 5, directly into the ingoing end 6 of the devolatilizing extruder 2.

In the region of the conveying and mixing section 4, the twin-screw extruder 1 has an injection chamber 7 with injection nozzle 7', which can be fed from a water-supply line 8 or from a suspension pump 9, where the suspension pump 9 can withdraw the suspension from a suspension silo 10. The suspension silo 10 has mixing units 11, by way of which the filler particles remain distributed as uniformly possible in the suspension, with no agglomeration of the filler particles in the suspension.

The devolatilizing extruder 2 has a vacuum connection 12, i.e. in this case merely a devolatilizing duct by way of which, in the region of an evacuation drum 13, the melt conveyed from the twin-screw extruder 1 into the devolatilizing extruder 2 can be devolatilized.

The melt is introduced by way of a discharge unit 14, e.g. a screw or pump, into a discharge die 15.

Coupled to the drive 17 of the twin-screw extruder 1 and the drive 18 of the devolatilizing extruder 2 there is a control device 16. It is thus possible to achieve ideal control of the plastifying and mixing procedure, and of the devolatilizing procedure, separately from one another and respectively per se. Also controlled by way of the control device 16, although this is not depicted in detail, are the intake of the feed hopper 3, the suspension pump 9, the mixing unit 11, the water-supply line 8, adjustable conveying and shearing elements 19 of the devolatilizing extruder 2, the vacuum connection 12, or the discharge unit 14. However, other sensors not depicted, e.g. the pressure gauge 20 or pressure sensor on the vacuum connection, temperature sensor, RPM counter, etc. transmit signals to the control device 16, which controls not only start-up but also production by way of the cascade arrangement.

In the twin-screw extruder 1, the polymer starting material is first plastified, and is transported by way of the conveying and mixing section 4 to the outgoing end 5. The control device 16 here controls the drive 17 in relation to rotation rate and power consumption and, as determined by the signals from a pressure sensor 21, the flow restrictor 5 in relation to the pressure generated in the conveying and mixing section 4.

By way of a gas connection 22 likewise controllable by the control device 16 it is possible to feed inert gas into the injection chamber 7 under appropriately controllable pressure, in order that the viscosity of the melt can be even more effectively influenced.

For the start-up procedure, the water-supply line 8 is first activated by way of the control device 16, while no drive is yet applied to the suspension pump 9. Once an appropriate pressure, which can be determined by the pressure sensor 21, has been generated in the conveying section, and the introduction of water has resulted in a desirably low viscosity of the polymer melt, the control device 16 is used to discontinue the water supply 8 and activate the suspension pump 9 so that the suspension can then be conveyed by the suspension pump 9 from the suspension silo 10 into the twin-screw extruder 1. Here, the suspension is incorporated in the most ideal manner into the polymer melt, with control of the rotation rate and the power consumption of the drive 17. Once the polymer melt, thus mixed, has been discharged from the twin-screw extruder 1, the melt is passed by way of conveying and shearing elements 19 into the evacuation drum 13 of the devolatilizing extruder 2. The conveying and shearing elements 19 and the signals from the pressure gauge 20 serve here to meter the melt prior to entry into the evacuation drum 13 in a manner that gives an ideal quantity of melt present in the evacuation drum, where it is circulated and transported by way of screws; the surface that the melt offers to the vacuum here is maximized and continuously self-renewing, and the devolatilization of the melt can therefore take place very rapidly and effectively. This results in a further increase of the chain length of the polymer molecules, despite the shear forces that are also introduced into the melt by way of the evacuation drum. The viscosity of the polymer melt increases. For a preset flow rate and flow velocity, the desired viscosity of the polymer melt can be set by using the control device 16 to adjust the vacuum.

At the outgoing end of the evacuation drum the melt is introduced by way of the discharge unit 14 into the discharge die 15.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for the production of polymers in which fillers are incorporated and homogeneously distributed, the method comprising:

inputting a polymer starting material into a twin-screw extruder and melting the polymer starting material in the twin-screw extruder to provide a melt; and injecting, in a conveying and mixing section, a suspension into the melt, the suspension comprising the fillers and a carrier liquid, the fillers having particle sizes below 10 µm;

reducing a melt viscosity of the melt by the injecting of the carrier liquid in the conveying and mixing section, wherein a cleavable polycondensate is used as a polymer in the polymer starting material and a low-molecular-weight cleavage product that arises during polycondensation of the polycondensate is used as the carrier liquid, such that the melt is at least partially depolymerized within the conveying and mixing section by cleavage;

after reducing the melt viscosity, homogenizing the melt, a remainder of the carrier liquid and the fillers; and increasing, after the homogenization, the melt viscosity of the melt by use of a devolatilizing extruder in which, a vacuum is applied and the carrier liquid is removed from the devolatilizing extruder via the vacuum, such that a polycondensation is carried out.

2. The method as claimed in claim 1, wherein, before the suspension is injected, the carrier liquid is injected into the melt in order to induce the cleavage.

3. The method as claimed in claim 1, wherein a hydrolysable polycondensate is used as the polymer and water is used as the carrier liquid, such that the melt is hydrolyzed within the conveying and mixing section.

4. The method as claimed in claim 3, wherein the polymer is polyester.

5. The method as claimed in claim 1, wherein a polycondensate produced with elimination of a monohydric or polyhydric alcohol is used as the polymer, and a monohydric or polyhydric alcohol is used as the carrier liquid.

6. The method as claimed in claim 1, wherein a control device controls the individual process steps and initiates a start-up procedure in which initially only the carrier liquid is injected into the conveying and mixing section to reduce the melt viscosity of the melt, and wherein, after subsequent switchover by the control device from carrier-liquid injection to suspension injection the suspension is incorporated into the melt.

7. The method as claimed in claim 1, wherein a pressure in an injection chamber of the twin-screw extruder is between 25 bar and 50 bar.

8. The method as claimed in claim 7, wherein the pressure in the injection chamber is adjusted or controlled to 5 bar above to below a phase-transition boundary of the carrier liquid.

9. The method as claimed in claim 7, wherein the pressure in the injection chamber is controlled to between 20 bar and 200 bar, wherein a pressure sensor in the injection chamber provides actual pressure values to a control device, which sets a required pressure by influencing an adjustable melt-flow restrictor arranged between the twin-screw extruder and the devolatilizing extruder, and/or by influencing a suspension pump.

10. The method as claimed in claim 7, wherein an inert gas is added in a region of the injection chamber in order to maintain or improve control of the pressure.

11. The method as claimed in claim 1, wherein a control device controls an evacuation rate in the devolatilizing extruder by adjusting a pressure for a specified flow rate and flow velocity, thus permitting adjustment of the melt viscosity of the melt that is discharged.

* * * * *